United States Patent
Wu et al.

[11] Patent Number: 6,013,151
[45] Date of Patent: Jan. 11, 2000

[54] HIGH SPEED METHOD OF MAKING MICROPOROUS FILM PRODUCTS

[75] Inventors: Pai-Chuan Wu; Leopoldo V. Cancio; Girish K. Sharma, all of Cincinnati, Ohio

[73] Assignee: Clopay Plastic Products Company, Inc.

[21] Appl. No.: 09/080,063

[22] Filed: May 15, 1998

[51] Int. Cl.[7] .................................................. B29C 55/12
[52] U.S. Cl. ................. 156/229; 156/308.2; 156/244.27; 156/324; 264/288.4; 264/290.2; 264/414
[58] Field of Search ..................................... 156/181, 229, 156/244.27, 308.2, 324; 264/220, 288.4, 290.2, 413, 414, 464

[56] References Cited

U.S. PATENT DOCUMENTS

| | | |
|---|---|---|
| 2,714,571 | 8/1955 | Irion et al. . |
| 3,058,868 | 10/1962 | Schroeder . |
| 3,622,422 | 11/1971 | Newman . |
| 3,832,267 | 8/1974 | Liu . |
| 4,153,664 | 5/1979 | Sabee . |
| 4,376,147 | 3/1983 | Byrne et al. . |
| 4,379,197 | 4/1983 | Cipriani et al. . |
| 4,452,845 | 6/1984 | Lloyd et al. . |
| 4,472,328 | 9/1984 | Sugimoto et al. . |
| 4,517,714 | 5/1985 | Sneed et al. . |
| 4,522,203 | 6/1985 | Mays . |
| 4,582,871 | 4/1986 | Noro et al. . |
| 4,596,738 | 6/1986 | Metcalfe et al. . |
| 4,614,679 | 9/1986 | Farrington, Jr. et al. . |
| 4,626,574 | 12/1986 | Cancio et al. . |
| 4,692,368 | 9/1987 | Taylor et al. . |
| 4,704,813 | 11/1987 | Ito et al. . |
| 4,705,812 | 11/1987 | Ito et al. . |
| 4,725,473 | 2/1988 | Van Gompel . |
| 4,753,840 | 6/1988 | Van Gompel . |
| 4,777,073 | 10/1988 | Sheth . |
| 4,814,124 | 3/1989 | Aoyama et al. . |
| 4,921,652 | 5/1990 | Tsuji et al. . |
| 4,921,653 | 5/1990 | Aoyama et al. . |
| 5,035,941 | 7/1991 | Blackburn . |
| 5,202,173 | 4/1993 | Wu et al. . |
| 5,409,761 | 4/1995 | Langley . |
| 5,732,716 | 3/1998 | Utecht ..................................... 128/898 |

FOREIGN PATENT DOCUMENTS

| | | |
|---|---|---|
| 141592 | 5/1985 | European Pat. Off. . |

OTHER PUBLICATIONS

Schwarz, Eckhard C. A., *New Fibrillated Film Structures, Manufacture and Uses*, Pap. Synth. Conf. (TAPPI), 1976, pp. 33–39.

*Primary Examiner*—Sam Chuan Yao
*Attorney, Agent, or Firm*—Wood, Herron & Evans, L.L.P.

[57] ABSTRACT

Microporous film products permeable to moisture vapor and which act as barriers to liquid are made by a high speed method. Such microporous products are made at speeds in the order of above 500 fpm to about 1200 fpm. Thermoplastic polymers are melt blended to contain about 35% to about 45% by weight of a linear low density polyethylene, about 3% to about 10% by weight of a low density polyethylene; about 40% to about 55% by weight calcium carbonate filler particles, and about 2% to about 6% by weight of a triblock polymer of styrene.

37 Claims, 3 Drawing Sheets

HIGH SPEED METHOD OF MAKING MICROPOROUS FILM PRODUCTS

BACKGROUND OF THE INVENTION

Methods of making microporous film products have been known for some time. For example, U.S. Pat. No. 3,832,267, to Liu, teaches the melt-embossing of a polyolefin film containing a dispersed amorphous polymer phase prior to stretching or orientation to improve gas and moisture vapor transmission of the film. According to the Liu '267 patent, a film of crystalline polypropylene having a dispersed amorphous polypropylene phase is first embossed prior to biaxially drawing (stretching) to produce an oriented imperforate film having greater permeability. The dispersed amorphous phase serves to provide microvoids to enhance the permeability of the otherwise imperforate film to improve moisture vapor transmission (MVT). The embossed film is preferably embossed and drawn sequentially.

In 1976, Schwarz published a paper which described polymer blends and compositions to produce microporous substrates (Eckhard C. A. Schwartz (Biax-Fiberfilm), "New Fibrillated Film Structures, Manufacture and Uses", *Pap. Synth. Conf.* (TAPPI), 1976, pages 33–39). According to this paper, a film of two or more incompatible polymers, where one polymer forms a continuous phase and a second polymer forms a discontinuous phase, upon being stretched will phase separate thereby leading to voids in the polymer matrix and increasing the porosity of the film. The continuous film matrix of a crystallizable polymer may also be filled with inorganic filler such as clay, titanium dioxide, calcium carbonate, etc., to provide microporosity in the stretched polymeric substrate.

Many other patents and publications disclose the phenomenon of making microporous thermoplastic film products. For example, European patent 141592 discloses the use of a polyolefin, particularly ethylene vinyl acetate (EVA) containing a dispersed polystyrene phase which, when stretched, produces a voided film which improves the moisture vapor permeability of the film. This EP '592 patent also discloses the sequential steps of embossing the EVA film with thick and thin areas followed by stretching to first provide a film having voids which, when further stretched, produces a net-like product. U.S. Pat. Nos. 4,452,845 and 4,596,738 also disclose stretched thermoplastic films where the dispersed phase may be a polyethylene filled with calcium carbonate to provide the microvoids upon stretching. Later U.S. Pat. Nos. 4,777,073; 4,814,124; and 4,921,653 disclose the same processes described by the above-mentioned earlier publications involving the steps of first embossing a polyolefin film containing a filler and then stretching that film to provide a microporous product.

With reference to U.S. Pat. Nos. 4,705,812 and 4,705,813, microporous films have been produced from a blend of linear low density polyethylene (LLDPE) and low density polyethylene (LDPE) with barium sulfate as the inorganic filler having an average particle diameter of 0.1–7 microns. It is also known to modify blends of LLDPE and LDPE with a thermoplastic rubber such as Kraton. Other patents, such as U.S. Pat. No. 4,582,871, disclose the use of thermoplastic styrene block tripolymers in the production of microporous films with other incompatible polymers such as styrene. There are other general teachings in the art such as the disclosures in U.S. Pat. Nos. 4,472,328 and 4,921,652.

Relevant patents regarding extrusion lamination of unstretched nonwoven webs include U.S. Pat. Nos. 2,714,571; 3,058,868; 4,522,203; 4,614,679; 4,692,368; 4,753,840 and 5,035,941. The above '863 and '368 patents disclose stretching extruded polymeric films prior to laminating with unstretched nonwoven fibrous webs at pressure roller nips. The '203 and '941 patents are directed to co-extruding multiple polymeric films with unstretched nonwoven webs at pressure roller nips. The '840 patent discloses preforming nonwoven polymeric fiber materials prior to extrusion laminating with films to improve bonding between the nonwoven fibers and films. More specifically, the '840 patent discloses conventional embossing techniques to form densified and undensified areas in nonwoven base plies prior to extrusion lamination to improve bonding between nonwoven fibrous webs and films by means of the densified fiber areas. The '941 patent also teaches that unstretched nonwoven webs that are extrusion laminated to single ply polymeric films are susceptible to pinholes caused by fibers extending generally vertically from the plane of the fiber substrate and, accordingly, this patent discloses using multiple co-extruded film plies to prevent pinhole problems. Furthermore, methods for bonding loose nonwoven fibers to polymeric film are disclosed in U.S. Pat. Nos. 3,622,422; 4,379,197 and 4,725, 473.

It has also been known to stretch nonwoven fibrous webs using intermeshing rollers to reduce basis weight and examples of patents in this area are U.S. Pat. Nos. 4,153,664 and 4,517,714. The '664 patent discloses a method of incremental cross direction (CD) or machine direction (MD) stretching nonwoven fibrous webs using a pair of interdigitating rollers to strengthen and soften nonwoven webs. The '664 patent also discloses an alternative embodiment wherein the nonwoven fibrous web is laminated to the thermoplastic film prior to intermesh stretching.

Efforts have also been made to make breathable nonwoven composite barrier fabrics which are impervious to liquids, but which are permeable to water vapor. U.S. Pat. No. 5,409,761 is an example of a fabrication process from the patent art. According to this '761 patent, a nonwoven composite fabric is made by ultrasonically bonding a microporous thermoplastic film to a layer of nonwoven fibrous thermoplastic material. These methods and other methods of making breathable laminates of nonwoven and thermoplastic materials tend to involve expensive manufacturing techniques and/or expensive raw materials.

Notwithstanding the extensive development of the art for making breathable microporous films and laminates to provide air and moisture vapor permeabilities with liquid-barrier properties, further improvements are needed. In particular, improvements are desired for producing microporous film products and laminates on high-speed production machinery. It would be very desirable to produce microporous film products without undesirable pin holes and without draw resonance. In the past, attempts to increase production speeds have resulted in film breakage or film products with inconsistent properties.

SUMMARY OF THE INVENTION

This invention is directed to a high speed method of making a microporous thermoplastic film. The microporous film is permeable to air and water vapor, but is a barrier to liquid. Breathable laminates of microporous film with nonwoven substrates are also produced at high speeds according to the method of this invention.

The high speed method of this invention involves melt-blending a composition comprising
(a) about 35% to about 45% by weight of a linear low density polyethylene, (b) about 3% to about 10% by weight of a low density polyethylene, (c) about 40% to about 55% by weight calcium carbonate filler particles, and (d) about 2% to about 6% by weight of a triblock copolymer of styrene selected from the group consisting of styrene-butadiene-styrene, styrene-isoprene-styrene, and styrene-ethylene-butylene-styrene, and blends thereof.

The melt-blended composition is extruded, preferably through a slot die, into a nip of rollers with an air knife to form a film at a speed on the order of at least about 550 fpm to about 1200 fpm without draw resonance. Speeds of at least about 750 fpm to about 1200 fpm, or greater, have been achieved without draw resonance. The use of the air knife to assist in the elimination of draw resonance is known, for example, by reference to U.S. Pat. No. 4,626,574. Thereafter, an incremental stretching force is applied to the film at the high speeds along lines substantially uniformally across the film and throughout its depth to provide a microporous film. Thus, this invention provides a high speed method of making microporous films and laminates with nonwoven substrates of uniform gauge. The problem of draw resonance which has heretofore resulted in irregular gauge or thickness in the film products is avoided, even though line speeds of about 750–1200 fpm are achieved.

The blend of LLDPE and LDPE within the approximate ranges of components enables the production of film without breakage and pin holes when balanced with the prescribed amount of calcium carbonate. In particular, the LLDPE is present in an amount of about 35% to about 45% by weight in order to provide a sufficient amount of matrix to carry the calcium carbonate filler particles thereby enabling the film to be handled and stretched without pin holing and breakage. The LDPE in an amount of about 3% to about 10% by weight also contributes to the production of film without pin holing and enables the high speed production without draw resonance. The polymeric matrix is balanced with an amount of about 40% to about 55% by weight of calcium carbonate particles having an average particle diameter of preferably about 1 micron to achieve sufficient MVT in the range of about 1000 gms/m$^2$/day to 4000 gms/m$^2$/day. Furthermore, the melt-blended composition requires a triblock polymer in an amount of about 2% to about 6% by weight to facilitate stretching in high-speed production without breakage. An incremental stretching force is applied inline to the formed film under ambient conditions or at an elevated temperature at speeds of at least about 550 fpm to about 1200 fpm, or more, along lines substantially uniformly across the film and throughout it depth to provide a microporous film.

The method of this invention also involves lamination of the microporous-formable thermoplastic film to a nonwoven fibrous web during extrusion. The extrusion lamination is conducted at the same high speeds where a nonwoven fibrous web is introduced into the nip of rollers along with the microporous-formable thermoplastic extrudate. The compressive force between the fibrous web and the extrudate is controlled to bond one surface of the web to the film and form a laminate. The laminate is then incrementally stretched along lines substantially uniformly across the laminate and throughout its depth in one direction to render the film microporous. The laminate may be stretched in both the cross direction and the machine direction to provide breathable cloth-like liquid barriers capable of transmitting moisture vapor and air.

Other benefits, advantages and objectives of this invention will be further understood with reference to the following detailed description.

DETAILED DESCRIPTION OF THE INVENTION

It is the primary objective of this invention to produce a microporous film and laminated products thereof with non-woven fibrous webs on high-speed production machinery. It is the further objective of the method to produce such microporous film products of regular gauge, uniform porosity and without breakage.

A. Materials for the Method

As developed above, these and other objectives are achieved in a preferred form of the invention by first melt blending a composition of (a) about 35% to about 45% by weight of a linear low density polyethylene, (b) about 3% to about 10% by weight of a low density polyethylene, (c) about 40% to about 55% by weight calcium carbonate filler particles, and (d) about 2% to about 6% by weight of a triblock copolymer of styrene selected from the group consisting of styrene-butadiene-styrene, styrene-isoprene-styrene, and styrene-ethylene-butylene-styrene, and blends thereof, extruding said melt blended composition into a nip of rollers to form a film at a speed on the order of at least about 550 fpm to about 1200 fpm without draw resonance, and applying an incremental stretching force to said film at said speed along lines substantially uniformly across said film and throughout its depth to provide a microporous film.

More particularly, in a preferred form, the melt-blended composition consists essentially of about 42% by weight LLDPE, about 4% by weight LDPE, about 44% by weight calcium carbonate filler particles having an average particle size of about 1 micron, and about 3% by weight triblock polymer, especially styrene-butadiene-styrene. If desired, the stiffness properties of the microporous film products may be controlled by including high density polyethylene on the order of about 0–5% by weight and including 0–4% by weight titanium dioxide. Typically, processing aid such as a flurocarbon polymer in an amount of about 0.1% to about 0.2% by weight is added, as exemplified by 1-propene,1,1,2,3,3,3-hexafluoro copolymer with 1,1-difluoroethylene. The triblock polymer may also be blended with oil, hydrocarbon, antioxidant and stabilizer. Antioxidants include tetrakis (methylene(3,5-di-tert-butyl-4-hydroxyhydrocinnamate))methane (trade name is Irganox 1010), and tris(2,4-di-tert-butylphenyl)phosphite (trade name is Irgafos 168) at a total of 500–4000 ppm (parts per million).

Both embossed and flat films may be produced according to the principles of this invention. In the case of an embossed film, the nip of rollers comprises a metal embossing roller and a rubber roller. The compressive force between the rollers forms an embossed film of desired thickness on the order of about 0.5 to about 10 mils. It has also been found that rollers which provide a polished chrome surface form a flat film. Whether the film is an embossed film or a flat film, upon incremental stretching, at high speeds, microporous film products are produced having high moisture vapor transmission rate (MVTR) within the acceptable range of about 1000 to 4000 gms/m$^2$/day. It has been found that flat film can be incrementally stretched more uniformly than embossed film. The process may be conducted at ambient or room temperature or at elevated temperatures. As described above, laminates of the microporous film may be obtained with nonwoven fibrous webs.

The nonwoven fibrous web may comprise fibers of polyethylene, polypropylene, polyesters, rayon, cellulose, nylon, and blends of such fibers. A number of definitions have been proposed for nonwoven fibrous webs. The fibers are usually staple fibers or continuous filaments. The nonwovens are usually referred to as spunbond, carded, meltblown, and the like. The fibers or filaments may be bicomponent to facilitate bonding. For example, a fiber having a sheath and core of different polymers such as polyethylene (PE) and polypropylene (PP) may be used; or mixtures of PE and PP fibers may be used. As used herein "nonwoven fibrous web" is used in its generic sense to define a generally planar structure that is relatively flat, flexible and porous, and is composed of staple fibers or continuous filaments. For a detailed description of nonwovens, see "Nonwoven Fabric Primer and Reference Sampler" by E. A. Vaughn, Association of the Nonwoven Fabrics Industry, 3d Edition (1992).

In a preferred form, the microporous laminate employs a film having a gauge or a thickness between about 0.25 and 10 mils and, depending upon use, the film thickness will vary and, most preferably, in disposable applications is the order of about 0.25 to 2 mils in thickness. The nonwoven fibrous webs of the laminated sheet normally have a weight of about 5 gms/yd$^2$ to 75 gms/yd$^2$, preferably about 20 to about 40 gms/yd$^2$. The composite or laminate can be incrementally stretched in the cross direction (CD) to form a CD stretched composite. Furthermore, CD stretching may be followed by stretching in the machine direction (MD) to form a composite which is stretched in both CD and MD directions. As indicated above, the microporous film or laminate may be used in many different applications such as baby diapers, baby training pants, catamenial pads and garments, and the like where moisture vapor and air transmission properties, as well as fluid barrier properties, are needed.

B. Stretchers for the Microporous Film and Laminates

A number of different stretchers and techniques may be employed to stretch the film or laminate of a nonwoven fibrous web and microporous-formable film. These laminates of nonwoven carded fibrous webs of staple fibers or nonwoven spun-bonded fibrous webs may be stretched with the stretchers and techniques described as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addenda of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 Diametral pitch, 14½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal, CD or MD intermeshing stretchers may be employed to produce the incrementally stretched film or laminate of nonwoven fibrous web and microporous-formable film to form the microporous film products of this invention. For example, The stretching operation may be employed on an extrusion laminate of a nonwoven fibrous web of staple fibers or spun-bonded filaments and microporous-formable thermoplastic film. In one of the unique aspects of this invention a laminate of a nonwoven fibrous web of spun-bonded filaments may be incrementally stretched to provide a very soft fibrous finish to the laminate that looks like cloth. The laminate of nonwoven fibrous web and microporous-formable film is incrementally stretched using, for instance, the CD and/or MD intermeshing stretcher with one pass through the stretcher with a depth of roller engagement at about 0.060 inch to 0.120 inch at speeds from about 550 fpm to 1200 fpm or faster. The results of such incremental or intermesh stretching produces laminates that have excellent breathability and liquid-barrier properties, yet provide superior bond strengths and soft cloth-like textures.

The following examples illustrate the method of making microporous film and laminates of this invention. In light of these examples and this further detailed description, it is apparent to a person of ordinary skill in the art that variations thereof may be made without departing from the scope of this invention.

BRIEF DESCRIPTION OF THE DRAWINGS

The invention is further understood with reference to the drawings in which.

EXAMPLES 1–5

Blends of LLDPE and LDPE having the compositions reported in the following TABLE 1 were extruded to form films and the films were then incrementally stretched to provide microporous films.

TABLE 1

| Formulation (by wt.) | 1 | 2 | 3 | 4 | 5 |
|---|---|---|---|---|---|
| CaCO$_3$ | 44.2 | 44.2 | 44.2 | 44.2 | 44.2 |
| LLDPE | 44.1 | 44.9 | 41.9 | 41.9 | 41.9 |

TABLE 1-continued

| Formulation (by wt.) | 1 | 2 | 3 | 4 | 5 |
|---|---|---|---|---|---|
| LDPE | 1.5 | 3.7 | 3.7 | 3.7 | 3.7 |
| Others* | 10.2 | 10.2 | 10.2 | 10.2 | 10.2 |
| Screw RPM  A | 33 | 45 | 57 | 64 | 75 |
| Screw RPM  B | 33 | 45 | 57 | 64 | 75 |
| Basis wt. (gms/m$^2$) | 45 | 45 | 45 | 45 | 45 |
| Gauge (mils) | 2 | 2 | 2 | 2 | 2 |
| Line Speed (fpm) | 550 | 700 | 900 | 1000 | 1200 |
| Air Knife (cfm/inch) | 5–25 | 5–25 | 5–25 | 5–25 | 5–25 |
| Web Stability | Poor gauge control with draw resonance | Good web stability without draw resonance | | | |

*Other components include 2.5% by weight of a styrene-butadiene-styrene (SBS) triblock polymer, Shell Kraton 2122X, which is an SBS <50% by wt. + mineral oil <30% by wt., EVA copolymer <15% by wt., polystyrene <10% by wt., hydrocarbon resin <10% by wt., antioxidant/stabilizer <1% by wt., and hydrated amorphous silica <1% by wt.

Figure 1:
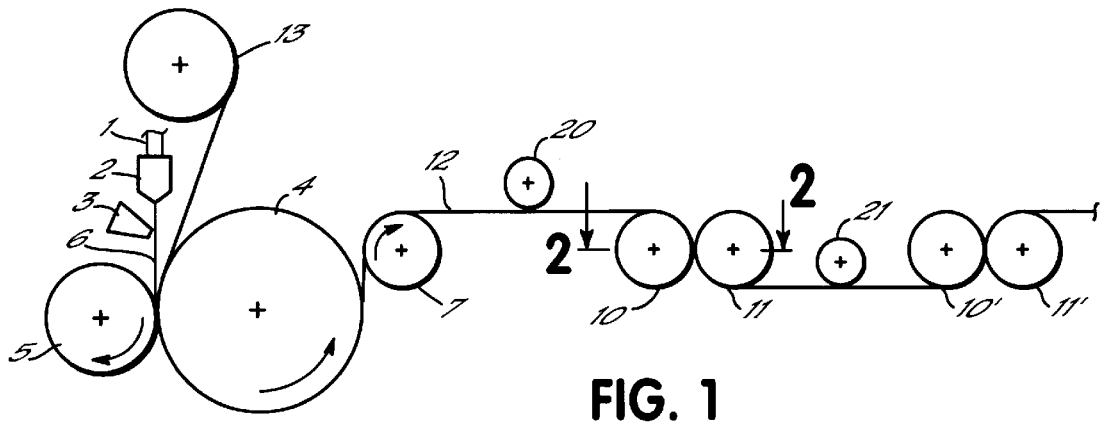
FIG. 1 is a schematic of an inline extrusion lamination and incremental stretching apparatus for making the microporous laminate of this invention.
Figure 2:
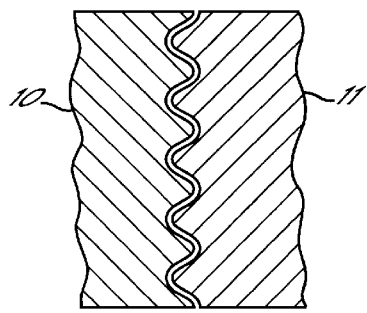
FIG. 2 is a cross sectional view taken along the line 2—2 of FIG. 1 illustrating the intermeshing rollers in diagrammatic form.

Each of the formulations of 1–5 were extruded into films employing an extrusion apparatus as shown diagramatically in FIG. 1. As shown, the apparatus may be employed for film extrusion with and without lamination. In the case of film extrusion, the formulations of Examples 1–5 were fed from an extruder 1 through slot die 2 to form the extrudate 6 into the nip of a rubber roll 5 and a metal roll 4 with an air knife 3. Where extrusion lamination is practiced, there is an incoming web of fibrous material 9 from roller 13 which is also introduced into the nip of the rubber roll 5 and metal roll 4. In Examples 1–5, the thermoplastic film was produced for subsequent incremental stretching to form the microporous film. As shown in TABLE 1, over speeds of about 550 fpm to 1200 fpm, a polyethylene film 6 on the order of about 2 mils in thickness was made which is taken off at roller 7. The air knife 3 has a length of about 120" and an opening of about 0.035"–0.060" and air is blown through the opening and against the extrudate 6 at about 5 cfm/inch to 25 cfm/inch. The compressive force at the nip and the air knife are controlled such that the film is made without pin holing and without draw resonance in the case of Examples 2–5. Where the LDPE was included in the composition at a level of 1.5% by weight, draw resonance was encountered at a line speed of 550 fpm. However, when the LDPE was included in the formulation at a level of 3.7% by weight with the LLDPE at a level of 44.1–44.9% by weight, film production was able to be achieved at high speeds greater than 550 fpm up to 1200 fpm without draw resonance. The melt temperatures from the feed zone to the screw tip of extruders A and B were maintained at about 400–430° F. with die temperatures of approximately 450° F. to extrude the precursor film around 2 mils (45 gms/m$^2$).

Figure 3:
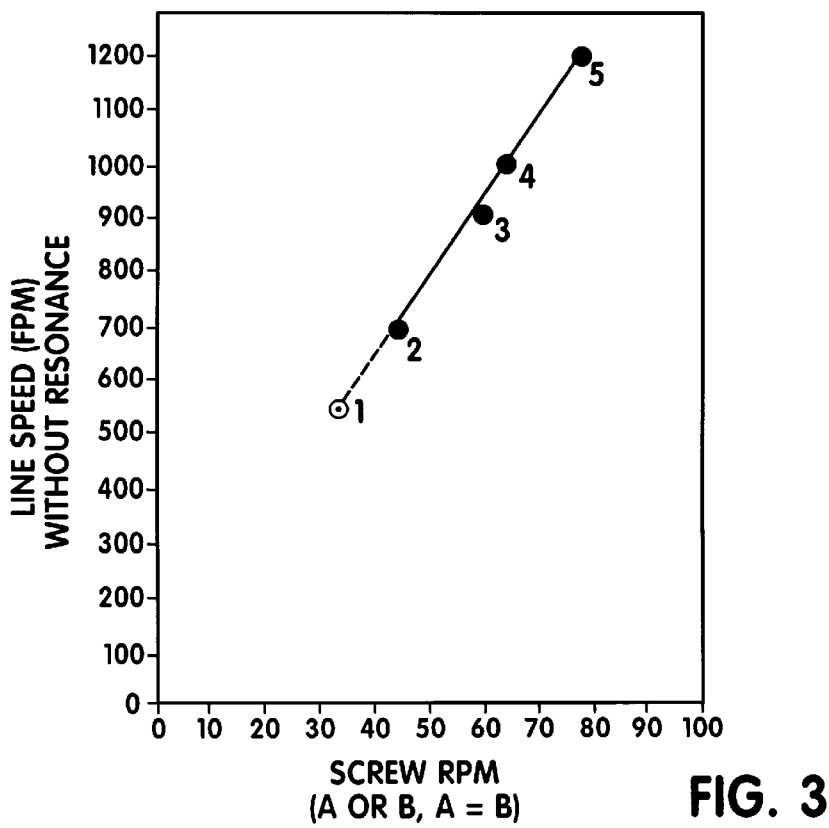
FIG. 3 is a graph demonstrating the line speeds for Examples 1–5.

FIG. 3 is a graph demonstrating the line speeds for Examples 1–5. Example 1, which contained only 1.5% by weight of LDPE, resulted in a poor film gauge control with draw resonance even with the air knife 3. However, when the LDPE was increased to about 3.7% by weight, excellent web stability was achieved without draw resonance even when line speeds were increased to about 1200 fpm. This is shown diagramatically in FIG. 3.

Figure 4:
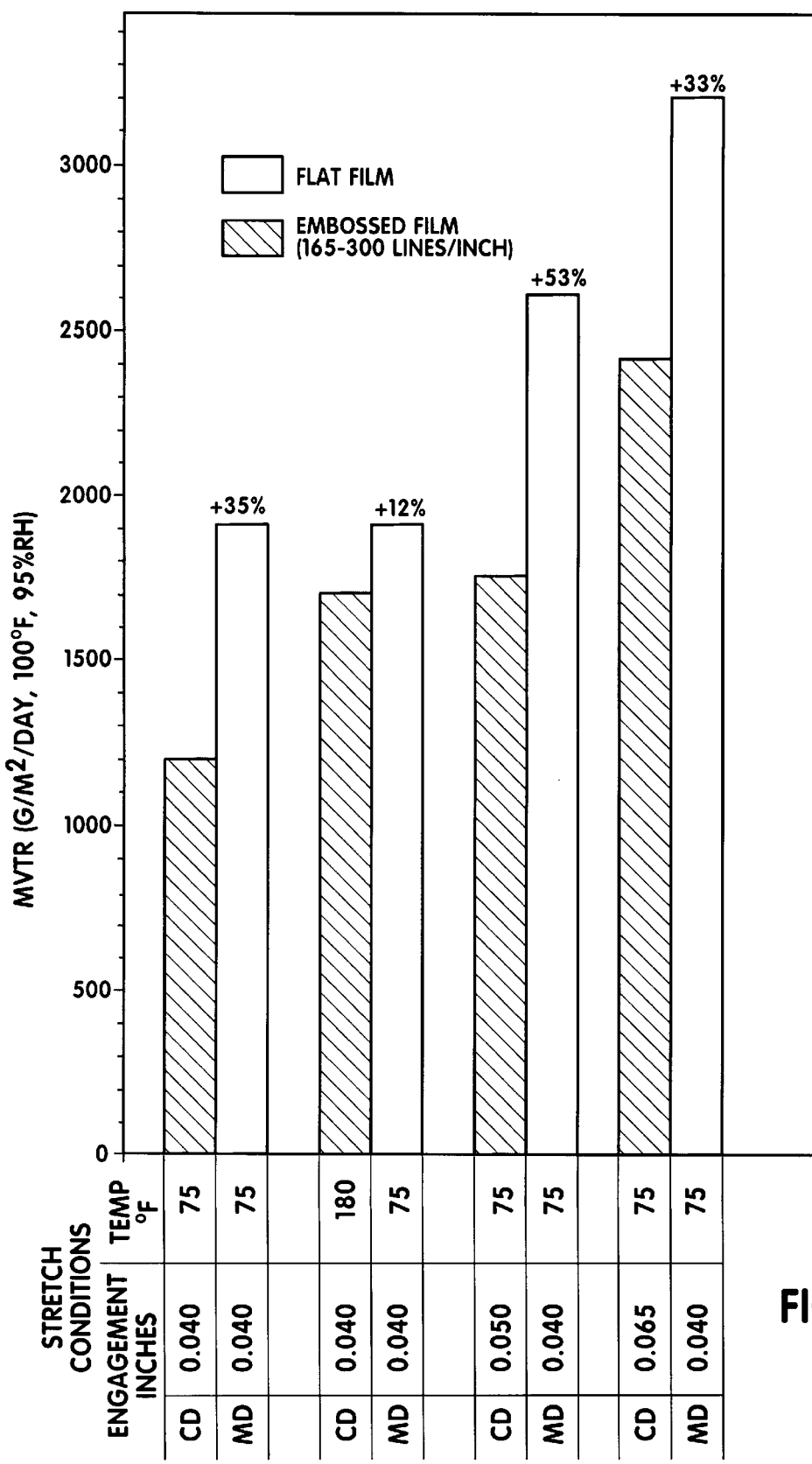
FIG. 4 is a graph demonstrating the moisture vapor transmission properties of both embossed and flat microporous films.
Figure 5:
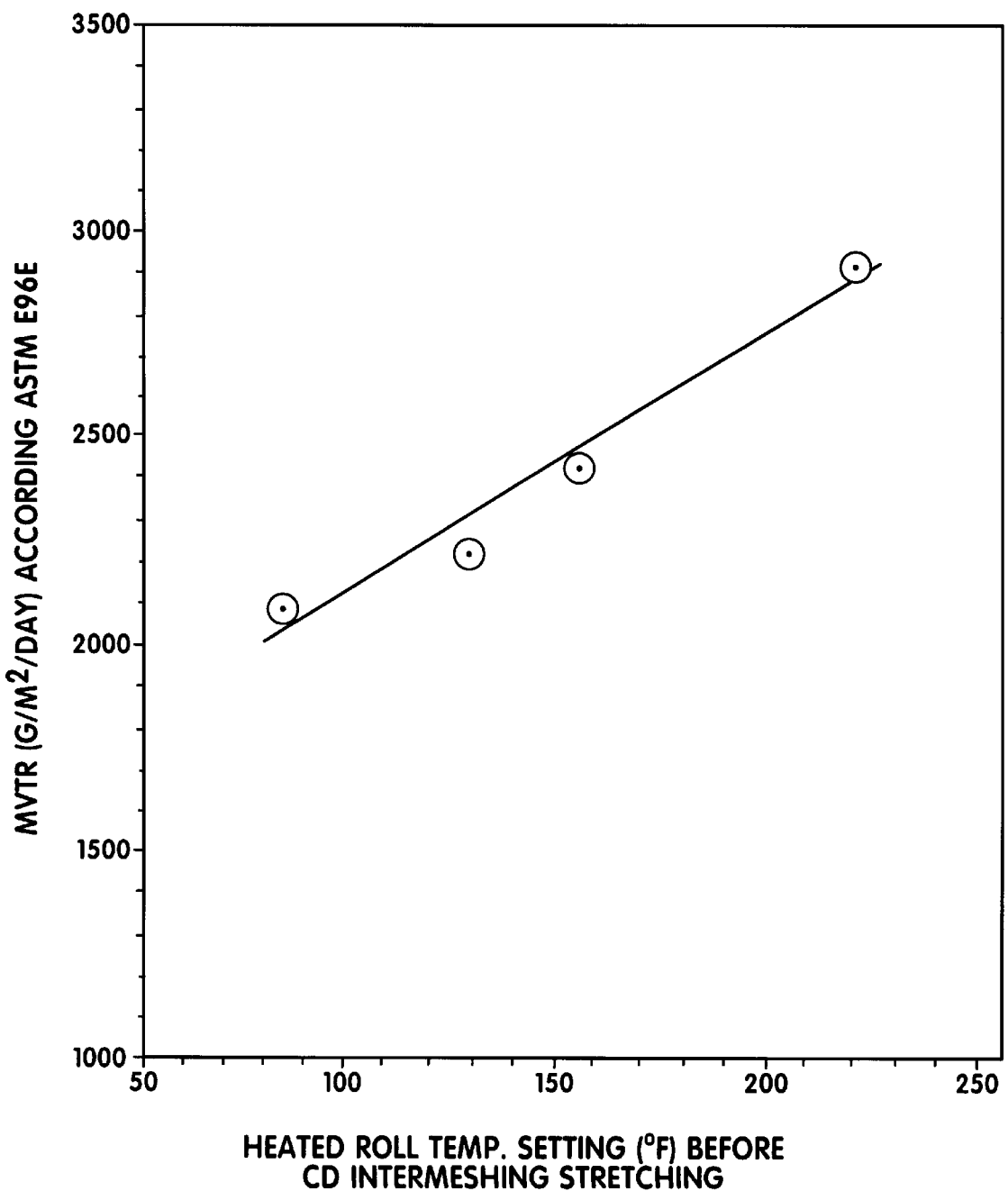
FIG. 5 is a graph demonstrating the moisture vapor transmission rate can be adjusted by heating the precursor film.

FIG. 4 is a graph demonstrating the moisture vapor transmission properties of both embossed and flat films resulting from incrementally stretching the precursor films of Examples 2–5 under different temperatures and stretch roller engagement conditions. As shown schematically in FIG. 1, where the incoming film 12 at ambient temperature was passed through temperature controlled rollers 20 and 21 before CD and MD incremental stretching rollers (10 and 11, and 10' and 11'), the temperatures and the depths of engagements can be controlled. Remarkably, the MVTR of the flat film exceeded the MVTR of the embossed film as shown in FIG. 4. In brief, MVTRs for the embossed film on the order of about 1200–2400 gms/m$^2$/day were achieved, whereas MVTRs for the flat film on the order of about 1900–3200 gms/m$^2$/day were achieved. Unexpectedly, as also shown in FIG. 5, the MVTR of the microporous film can also be controlled by the web temperature during the stretching. FIG. 5 shows the film when heated to different temperatures before CD stretching can result in different MVTRs. The data reported in FIG. 5 was for a CD rollers engagement dept of 0.065" and MD rollers engagement depth of 0.040" where the temperature of roller 21 was maintained at ambient. The embossed film was made with a metal embossing roller having a rectangular engraving of CD and MD lines with about 165–300 lines per inch. This pattern is disclosed, for example, in U.S. Pat. No. 4,376,147 which is incorporated herein by reference. This micro pattern provides a matte finish to the film but is undetectable to the naked eye.

In view of the above detailed description, it will be understood that variations will occur in employing the principles of this invention depending upon materials and conditions, as will be understood to those of ordinary skill in the art.

What is claimed is:

1. A high speed method of making a microporous thermoplastic film comprising
   melt blending a composition comprising
   (a) about 35% to about 45% by weight of a linear low density polyethylene,
   (b) about 3% to about 10% by weight of a low density polyethylene,
   (c) about 40% to about 55% by weight calcium carbonate filler particles, and
   (d) about 2% to about 6% by weight of a triblock copolymer of styrene selected from the group consisting of styrene-butadiene-styrene, styrene-isoprene-styrene, and styrene-ethylene-butylene-styrene, and blends thereof,
   extruding said melt blended composition into a nip of rollers with an air knife to form a film at a speed on the order of at least about 550 fpm to about 1200 fpm without draw resonance, and
   applying an incremental stretching force to said film at said speed along lines substantially uniformly across said film and throughout its depth to provide a microporous film.

2. The high speed method of claim 1 wherein said melt blended composition consists essentially of about 42% by weight linear low density polyethylene, about 4% by weight low density polyethylene, about 44% calcium carbonate filler particles, and about 3% by weight triblock polymer.

3. The high speed method of claim 1 wherein said melt blended composition further comprises about 0–5% by weight high density polyethylene, about 0–4% by weight titanium dioxide, and about 0.1% to about 0.2% by weight processing aid.

4. The high speed method of claim 3 wherein said melt blended composition comprises about 4% by weight high density polyethylene, about 3% by weight titanium dioxide, and about 0.1% by weight fluorocarbon polymer processing aid.

5. The high speed method of claim 4 wherein said fluorocarbon polymer processing aid is 1-propene,1,1,2,3,3,3-hexafluoro copolymer with 1,1-difluoroethylene.

6. The high speed method of claim 1 wherein said triblock polymer is preblended with oil, hydrocarbon, antioxidant and stabilizer.

7. The high speed method of claim 1 wherein said nip of rollers comprises a metal embossing roller having an engraving of CD and MD lines within 165–300 lines/inch and a rubber roller and the compressive force between said rollers is controlled to form an embossed film.

8. The high speed method of claim 1 wherein said rollers provide a polished chrome surface to form a flat film.

9. The high speed method of claim 1 comprising introducing a nonwoven fibrous web into said nip of rollers and controlling the compressive force between the web and the film at the nip to bond the surface of the web to the film to form a laminated microporous sheet.

10. The high speed method of claim 9 wherein said fibrous web comprises polyolefin fibers.

11. The high speed method of claim 10 wherein said fibers are selected from the group consisting of polypropylene, polyethylene, polyesters, cellulose, rayon, nylon and blends or coextrusions of two or more such fibers.

12. The high speed method of claim 11 wherein the fibrous web has a weight of from about 5 to about 70 gms/yd$^2$ and the microporous film has a thickness on the order of about 0.25 to about 10 mils.

13. The high speed method of claim 12 wherein said web is formed from staple fibers or filaments.

14. The high speed method of claim 1 wherein said incremental stretching step is conducted at ambient temperature.

15. The high speed method of claim 1 wherein said incremental stretching step is conducted at an elevated temperature.

16. The product of the method of claim 1.

17. The product of the method of claim 2.

18. The product of the method of claim 3.

19. A high speed method of making a microporous thermoplastic film comprising
    melt blending a composition comprising
    (a) about 35% to about 45% by weight of a linear low density polyethylene,
    (b) about 3% to about 10% by weight of a low density polyethylene,
    (c) about 40% to about 55% by weight calcium carbonate filler particles, and
    (d) about 2% to about 6% by weight of a triblock copolymer of styrene selected from the group consisting of styrene-butadiene-styrene, styrene-isoprene-styrene, and styrene-ethylene-butylene-styrene, and blends thereof,
    slot die extruding said melt blended composition into a nip of rollers with an air knife to form a film of about 0.5 to about 10 mils in thickness at speeds on the order of at least about 750 fpm to about 1200 fpm without draw resonance,
    cooling said film to ambient temperature, and
    applying an incremental stretching force to said cooled film at said speed along lines substantially uniformly across said film and throughout its depth to provide a microporous film.

20. The high speed method of claim 19 wherein said film is traveling in a machine direction and incremental stretching force is applied across the machine direction of the traveling film and by application of a stretching force in the machine direction of the traveling film to provide the microporous film.

21. The high speed method of claim 19 wherein said composition consists essentially of about 42% by weight linear low density polyethylene, about 4% by weight low density polyethylene, about 44% by weight calcium carbonate filler particles, about 3% by weight triblock polymer, about 0–5% by weight high density polyethylene, about 0–4% by weight titanium dioxide, and about 0.1% to about 0.2% by weight processing aid.

22. The high speed method of claim 19 wherein said melt blended composition comprises about 4% by weight high density polyethylene, about 3% by weight titanium dioxide, and about 0.1% by weight fluorocarbon polymer processing aid.

23. The high speed method of claim 22 wherein said fluorocarbon polymer processing aid is 1-propene, 1,1,2,3,3,3-hexafluoro copolymer with 1,1-difluoroethylene.

24. The high speed method of claim 23 wherein said triblock polymer is preblended with oil, hydrocarbon, antioxidant and stabilizer.

25. The high speed method of claim 19 wherein said nip of rollers comprises a metal embossing roller having an engraving of CD and MD lines with about 165–300 lines/ inch and a rubber roller and the compressive force between said rollers is controlled to form an embossed film.

26. The high speed method of claim 19 wherein said rollers provide a polished chrome surface to form a flat film.

27. The high speed method of claim 19 comprising introducing a nonwoven fibrous web into said nip of rollers and controlling the compressive force between the web and the film at the nip to bond the surface of the web to the film to form a laminated microporous sheet.

28. The method of claim 27 wherein said fibrous web is formed of fibers selected from the group consisting of polypropylene, polyethylene, polyesters, cellulose, rayon, nylon and blends or coextrusions of two or more such fibers.

29. The method of claim 28 where in the fibrous web has a weight of from about 5 to about 70 gms/yd$^2$ and the microporous film has a thickness on the order of about 0.25 to about 10 mils.

30. The high speed method of claim 19 wherein said incremental stretching step is conducted at ambient temperature.

31. The high speed method of claim 19 wherein said incremental stretching step is conducted at an elevated temperature.

32. The product of the method of claim 19.
33. The product of the method of claim 20.
34. The product of the method of claim 21.
35. The product of the method of claim 22.
36. The product of the method of claim 28.
37. The product of the method of claim 29.

* * * * *